United States Patent
Fleck et al.

(10) Patent No.: US 6,887,044 B2
(45) Date of Patent: May 3, 2005

(54) GAS TURBINE BLADE

(75) Inventors: Robert Fleck, Adelsdorf (DE); Thomas Jansing, Erlangen (DE); Eckart Schumann, Muelheim A.D. Ruhr (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 10/670,807

(22) Filed: Sep. 25, 2003

(65) Prior Publication Data

US 2004/0057832 A1 Mar. 25, 2004

Related U.S. Application Data

(63) Continuation of application No. PCT/EP02/03556, filed on Mar. 28, 2002.

(30) Foreign Application Priority Data

Apr. 3, 2001 (EP) .......................................... 01108371

(51) Int. Cl.$^7$ ................................................. F01D 5/18
(52) U.S. Cl. ................... 416/241 B; 428/632; 428/336; 428/701; 428/702
(58) Field of Search ....................... 416/241 B; 428/632, 428/310.5, 323, 336, 697, 699, 701, 702

(56) References Cited

U.S. PATENT DOCUMENTS

| | | | |
|---|---|---|---|
| 4,576,874 A | 3/1986 | Spengler et al. | |
| 4,878,812 A | 11/1989 | Kito et al. | |
| 5,223,045 A | * 6/1993 | Priceman | ..................... 148/268 |
| 5,338,577 A | 8/1994 | Burdette, II | |
| 5,350,599 A | 9/1994 | Rigney et al. | |
| 6,764,771 B1 | * 7/2004 | Heimberg et al. | .......... 428/472 |

FOREIGN PATENT DOCUMENTS

| | | |
|---|---|---|
| CH | 660 200 | 3/1987 |
| WO | 96/34128 | 10/1996 |
| WO | 98/26110 | 6/1998 |
| WO | 00/55386 | 9/2000 |
| WO | 01/00539 | 1/2001 |
| WO | 01/18274 | 3/2001 |

OTHER PUBLICATIONS

Lallemand et al. "Fabrication process of spinel powder for plasma spraying", Journal of the European Ceramic Society, Elsevier Science Pub., Barking, Essex, GB, Bd. 18, Nr. 14, Dec. 1, 1998, S. 2095–2100.

* cited by examiner

Primary Examiner—Ninh H. Nguyen

(57) ABSTRACT

Disclosed is a gas turbine blade (1) having a ceramic heat-insulating layer (17). The ceramic heat-insulating layer (17) consists of 10–95% wt. % magnesium aluminate, 5–90 wt. % magnesium oxide and 0–20 wt. % aluminum oxide. Magnesium oxide particles are incorporated into a matrix made of spindle-shaped magnesium aluminate, enabling the thermal expansion coefficient of the ceramic heat-insulating layer (17) to be adapted in a particularly suitable manner to a metallic base body (15) of the gas turbine blade (1). The ceramic heat-insulating layer (17) also has a porosity which is greater that 3 vol. %, thereby guaranteeing sufficiently low heat conductivity.

20 Claims, 3 Drawing Sheets

GAS TURBINE BLADE

CROSS REFERENCE TO RELATED APPLICATIONS

This application is a continuation of International Application No. PCT/EP02/03556, filed Mar. 28, 2002 and claims the benefit thereof. The International Application claims the benefits of European application No. 01108371.4 EP, filed Apr. 3, 2001, both applications are incorporated by reference herein in their entirety.

FIELD OF INVENTION

The invention relates to a gas turbine blade with a ceramic thermal insulation layer.

BACKGROUND OF INVENTION

WO 01/00539 A2 discloses a ceramic thermal insulation material for high-temperature applications. The material is developed in such a way that a thermal coefficient of expansion is adapted to that of a metal so that, when applying the ceramic material in the form of a coating on a metallic basic body, there are only limited thermal stresses owing to a different thermal expansion. For this purpose, the ceramic material has between 10 and 95 percent by weight magnesium aluminate ($MgAl_2O_4$) MgAl spinel, between 5 and 90 percent by weight magnesium oxide (MgO) and up to 20 percent by weight aluminum oxide ($Al_2O_3$). Granules of magnesium oxide are also embedded in a magnesium aluminate matrix. It is embodied in such a way that the magnesium aluminate must exist as a homogeneous matrix that does not exist as sintered-together magnesium aluminate granules with intermediate cavities, but as homogeneous pore-free magnesium aluminate. In this structure, the magnesium aluminate is sufficiently thermally stable to also preserve a casing enclosing the magnesium oxide during the process of thermal spraying. In this way, the area of the magnesium oxide remains enclosed during thermal spraying and the magnesium oxide cannot sublimate or evaporate. The application of the ceramic component is provided in a high-temperature fuel cell where a very impervious, non-porous ceramic layer must be used to prevent gas losses.

WO 98/26110 discloses a thermal insulation layer for high-temperature applications especially in gas turbine blades. Such gas turbine blades are exposed to particularly high temperatures and at the same time subjected to high thermal stresses. Therefore, these gas turbine blades are often made of a nickel, cobalt or an iron base superalloy that has special strengths at high-temperatures. The gas turbine blades are also cooled via an internal cooling system by means of cooling air. The gas turbine blades are also protected via a protective layer system that consists of a metallic corrosion protective layer to which a ceramic thermal insulation layer has been applied. A typical metallic corrosion protective layer is, for example, a layer of the base alloy MCrAlY, that not only fends off corrosive attacks on the basic body, but also acts as an adhesion agent for the ceramic thermal insulation layer. A particular problem is a thermal alternating load because the ceramic thermal insulation layer has different thermal expansion coefficients compared to those of the metallic basic body or the metallic corrosion protective layer that leads to thermal stresses. On the other hand, this significantly limits the service life because failure of the ceramic thermal insulation layer because of peeling off determines the service life of the gas turbine blade. Conventional thermal insulation layers on a zirconium dioxide base that are usually phase-stabilized with yttrium oxide can sometimes be replaced with new ceramics that are ternary oxides and have a pyrochlore or perovskite structure. Typically, ceramic thermal insulation layers are applied by atmospheric plasma spraying or electron beam evaporation.

SUMMARY OF INVENTION

The object of the invention is to specify a gas turbine blade with a ceramic thermal insulation layer that has a particularly long service life.

This object is achieved according to the invention by a gas turbine blade with a ceramic thermal insulation layer that comprises 10 to 95 percent by weight magnesium aluminate ($MgAl_2O_4$), 5 to 90 percent by weight magnesium oxide (MgO), 0 to 20 percent by weight aluminum oxide ($Al_2O_3$) as well as a residue of ordinary impurities and is embedded in the granules of magnesium oxide (MgO) with an average diameter of 0.1 $\mu$m to 10 $\mu$m in a matrix of spinel-shaped magnesium aluminate ($MgAl_2O_4$), whereby the ceramic thermal insulation layer has a porosity exceeding 3 percent by volume.

The gas turbine blade can be embodied both as a rotor blade and as a stationary blade.

A porosity exceeding 3 percent by volume means that there are cavities in the ceramic thermal insulation layer with a content by volume exceeding 3%. Such porosity is practically imperative for a ceramic thermal insulation layer of a gas turbine blade because the low thermal conductivities that protect the cooled basic body of the gas turbine blade can only be obtained in this way. Preferably, the content by volume of the cavities should not exceed 40%. As described above, the above-mentioned material of the ceramic thermal insulation layer, i.e. the magnesium oxide (MgO) granules in a magnesium aluminate ($MgAl_2O_4$) matrix, adapts particularly well to the metallic thermal coefficients of expansion. The thermal coefficients of expansion are increased by the granules of magnesium oxide (MgO). It was previously assumed that, under high temperatures during thermal spraying, the magnesium oxide was not suitable for a ceramic thermal insulation layer. Even for a matrix of magnesium aluminate ($MgAl_2O_4$) with a spinel structure it was assumed that a stability of the magnesium oxide can only be obtained by means of an impervious matrix of magnesium aluminate ($MgAl_2O_4$) that has no cavities. However, because such impervious, non-porous structures, as mentioned above, are not suitable for a gas turbine blade application, this material was not taken into consideration as a ceramic thermal insulation layer on a gas turbine blade. However, according to knowledge of the invention it is now possible to make a porous ceramic thermal insulation layer of the above-mentioned type in a conventional process of thermal spraying. As a result, the particularly good adaptation of the thermal coefficients of linear expansion of the ceramic thermal insulation layer to the metallic basic body can now especially be used for the gas turbine blade.

A) The MgO granules preferably have an average diameter of 0.1 $\mu$m to 2 $\mu$m. This grain size is particularly advantageous for the spraying ability of the ceramic material.

B) The material of the thermal insulation layer preferably contains 55 to 80 percent by weight magnesium oxide. Depending on the magnesium oxide content, such a material has a thermal coefficient of expansion which lies between 11 and $12 \times 10^{-6}$ $K^{-1}$ at 1000° C. In this range the material adapts particularly well to the thermal coefficients of expansion of the metallic basic body.

C) The thermal insulation layer also contains at least one oxide from the calcium oxide, silicon oxide, zirconium oxide and iron oxide group. As additives, these materials have a favorable effect on the material properties of the material.

D) The gas turbine blade preferably has a basic body of a nickel or cobalt base superalloy, whereby the ceramic thermal insulation layer is applied to the basic body and whereby a first layer is applied adjacent to the basic body, to which a second layer differing from the first layer has been applied.

E) The basic body also preferably includes a metallic corrosion protective layer applied to the superalloy.

F) The above-mentioned first layer preferably consists of 10 to 95 percent by weight magnesium aluminate ($MgAl_2O_4$) and 5 to 90 percent by weight magnesium oxide (MgO) as well as 0 to 20 percent by weight aluminum oxide ($Al_2O_3$), whereas the second layer consists of yttrium oxide-stabilized zirconium dioxide. It is also feasible that this composition of the first and second layers is reversed, i.e. that the first layer consists of yttrium oxide-stabilized zirconium dioxide whereas the second layer consists of 10 to 95 percent by weight magnesium aluminate ($MgAl_2O_4$) and 5 to 90 percent by weight magnesium oxide (MgO) as well as 0 to 20 percent by weight aluminum oxide ($Al_2O_3$). In such a layer system, the tested properties of the conventional zirconium dioxide can be combined with the particularly favorable properties regarding the thermal expansion ability of the new ceramic material of magnesium aluminate ($MgAl_2O_4$) and magnesium oxide (MgO).

G) The first and second layers preferably consist of 10 to 95 percent by weight magnesium aluminate ($MgAl_2O_4$) and 5 to 90 percent by weight magnesium oxide (MgO) as well as 0 to 20 percent by weight aluminum oxide ($Al_2O_3$), whereby the first layer has a smaller porosity than the second layer. The required porosity can then also particularly be obtained by the second layer lying on the outside whereas there is a more impervious structure in the first layer that, with regard to corrosive attacks, shields the hot gas more effectively against the metallic basic body lying beneath it.

H) The ceramic thermal insulation layer is preferably applied to a ceramic basic layer that has a porosity of less than 2 percent by volume. The ceramic basic layer can have the same chemical composition as the ceramic thermal insulation layer, but is sometimes also applied virtually completely imperviously to the metallic basic body. Therefore, the known porosity of the ceramic thermal insulation layer does not refer to this ceramic base layer. On the one hand, this again leads to a particularly favorable combination of good thermal insulation properties and, on the other hand, shields against corrosive attacks.

I) The porosity in the ceramic thermal insulation layer preferably increases in increments towards the outside. Whereas layer systems defined for the combination of low and high porosity have also been mentioned thus far, a gradual transition from an impervious structure to a structure with higher porosity is now proposed.

The embodiments according to paragraphs A) to I) can also be combined with one another.

As an example, the invention is explained in greater detail in the drawings. The following are shown partly diagrammatically and not according to scale:

DETAILED DESCRIPTION OF INVENTION

Figure 1:
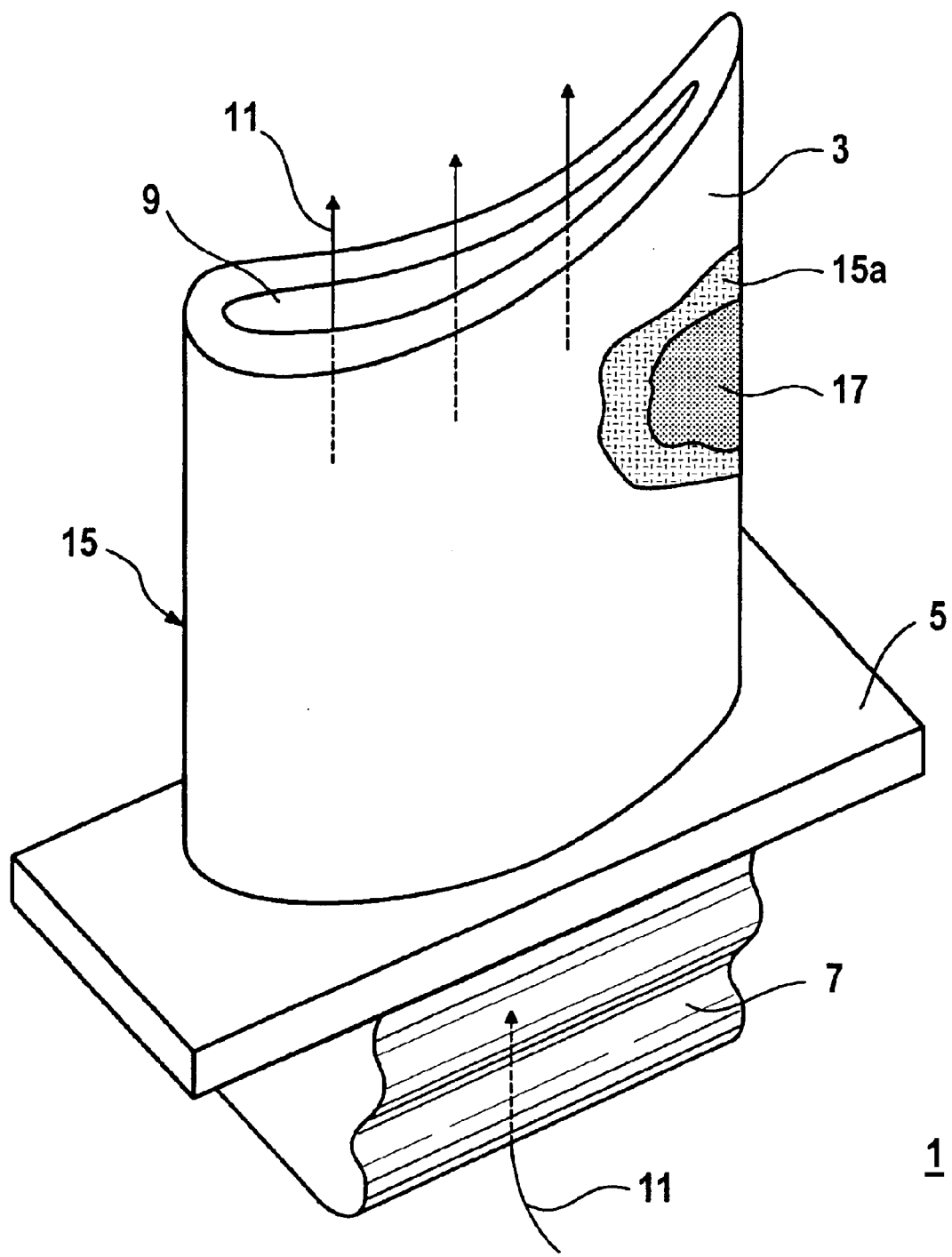
FIG. 1 a gas turbine blade.

FIG. 1 shows a gas turbine blade 1. The gas turbine blade 1 has a blade 3, a platform 5 and a blade foot 7. The gas turbine blade 1 also has an inner cavity 9 through which cooling air 11 is fed for cooling. The gas turbine blade 1 is made up of a basic body 15 that consists of a nickel or cobalt base superalloy. The basic body 15 also includes an outer metallic corrosion protective layer 15A that provides both corrosion protection and bonds with the ceramic thermal insulation layer. Such a ceramic thermal insulation layer 17 is applied to the corrosion protective layer 15A.

When using the gas turbine blade 1, a very hot gas flows around blade 3. It is technically necessary to intensively cool the gas turbine blade 1 with cooling air 11. In addition, the ceramic thermal insulation layer 17 must thermally shield the gas turbine blade 1 from the hot gas. The platform 5 is used to shield the hot gas from a rotor disk not shown in greater detail. The blade foot 7 also engages in such a rotor disk, by means of which the gas turbine blade 1 is attached to a gas turbine rotor.

Figure 2:
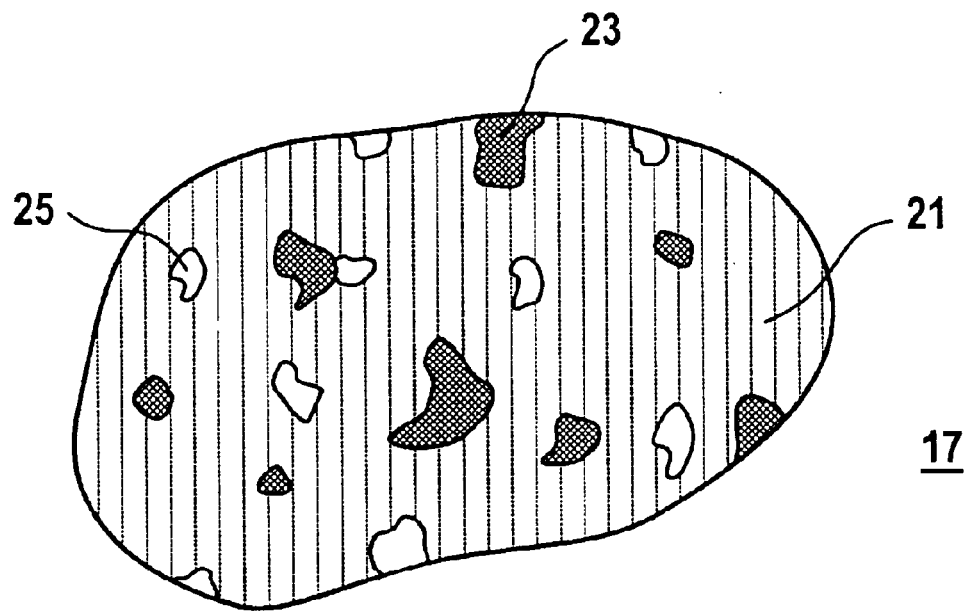
FIG. 2 a ceramic thermal insulation layer.

FIG. 2 diagrammatically shows the ceramic thermal insulation layer 17. Granules 23 of magnesium oxide are embedded in a matrix 21 of spinel-shaped magnesium aluminate. This composition particularly increases the coefficients of thermal expansion compared to a conventional ceramic thermal insulation layer so that the thermal coefficient of thermal expansion of the thermal insulation layer 17 adapts better to the thermal coefficients of thermal expansion of the basic body 15. This leads to lower thermal stresses which particularly in the case of a thermal alternating load results in a considerably longer service life for both the ceramic thermal insulation layer 17 and the gas turbine blade 1. Surprisingly enough, the ceramic thermal insulation layer 17 can be made with a considerable porosity. This porosity means that cavities 25 are included in the ceramic thermal insulation layer 17. The porosity exceeds 3 percent by volume, and preferably 5 percent by volume. A sufficiently low thermal conductivity for the ceramic thermal insulation layer 17 is only obtained by means of this porosity.

Figure 3:
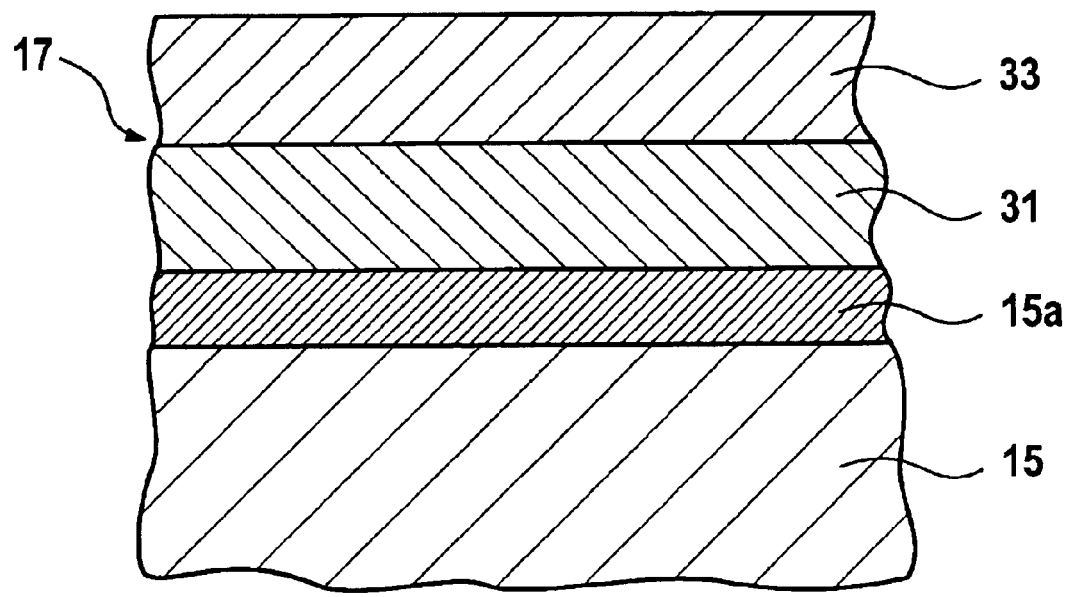
FIG. 3 a longitudinal section of a configurations of a ceramic thermal insulation layer on a basic body of a gas turbine blade, FIG 4 a longitudinal section if an alternative configuration of a ceramic thermal insulation layer on a basic body of a gas turbine blade, FIG 5 a longitudinal section if another alternative configuration of a ceramic thermal insulation layer on a basic body of a gas turbine blade, The same reference characters have the same meaning in the different figures.

FIG. 3 is a longitudinal section of a ceramic thermal insulation layer 17 that is applied to a basic body 15 of a gas turbine blade 1. Here, the ceramic thermal insulation layer 17 consists of two layers: a first layer 31 that is adjacent to the basic body 15, i.e. to the corrosion protective layer 15A and a second layer 33 applied to the first layer 31. The layers 31 and 33 can differ both chemically and structurally from one another. The first layer 31, in particular, can consist of the above-mentioned magnesium aluminate/magnesium oxide mixture whereas the second layer 33 consists of a conventional yttrium-stabilized zirconium dioxide ceramic. A reversed composition is also feasible. The first layer 31 can also be applied with a lower or even disappearing porosity whereas the second layer 33 has a high porosity. By this, a lower thermal conductivity is combined with a higher shielding against corrosive gases.

Figure 4:
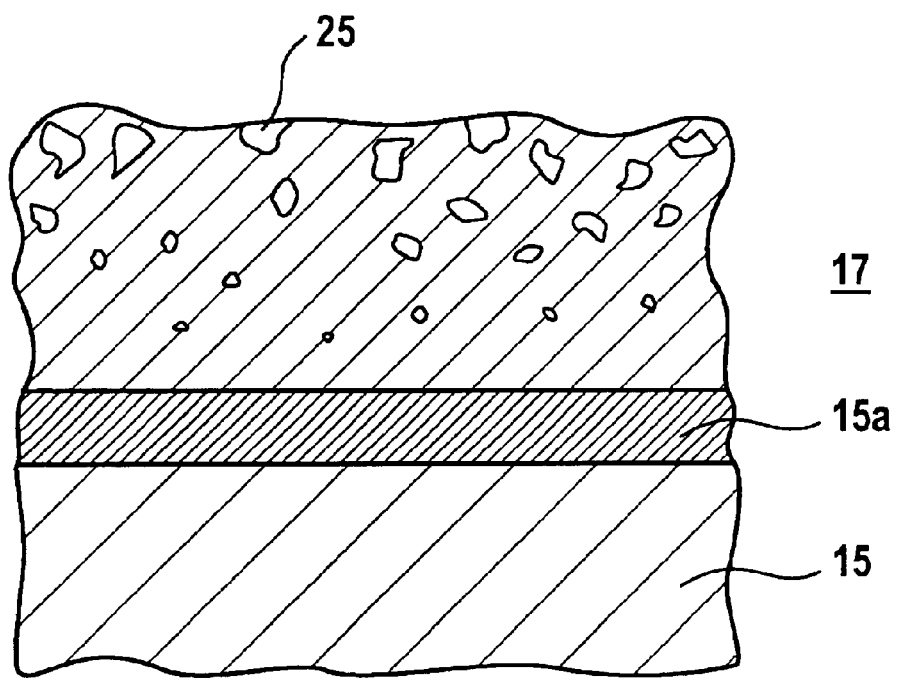

FIG. 4 shows a further embodiment of a ceramic thermal insulation layer 17 arranged on a basic body 15 of a gas turbine blade 1. The average diameter of the cavities 25 increases here in a direction away from the basic body 15 toward the outside. On the one hand, this gradual or incremented structure again leads to the favorable combination of thermal insulation properties and, on the other hand, shields against the corrosive gas.

Figure 5:
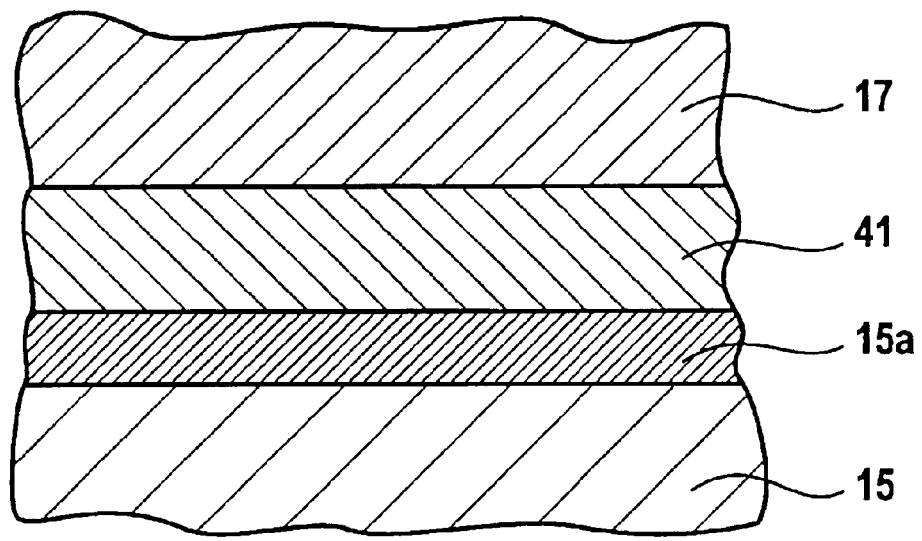

In FIG. 5, the ceramic thermal insulation layer 17 is applied to a ceramic base layer 41. The ceramic base layer 41 can differ both chemically and structurally from the ceramic thermal insulation layer 17.

What is claimed is:

1. A gas turbine blade with a ceramic thermal insulation layer that comprises 10 to 95 percent by weight magnesium aluminate ($MgAl_2O_4$), 5 to 90 percent by weight magnesium oxide (MgO), 0 to 20 percent by weight aluminum oxide ($Al_2O_3$) as well as a residue of ordinary impurities and is embedded in the granules of magnesium oxide (MgO) with an average diameter of 0.1 μm to 10 μm in a matrix of spinel-shaped magnesium aluminate ($MgAl_2O_4$), whereby the ceramic thermal insulation layer has a porosity exceeding 3 percent by volume.

2. The gas turbine blade according to claim 1, whereby the granules have an average diameter of 0.1 μm to 2 μm.

3. The gas turbine blade according to claim 1, whereby the thermal insulation layer contains 55 to 80 percent by weight magnesium oxide (MgO).

4. The gas turbine blade according to claim 1, whereby the thermal insulation layer also comprises at least one oxide selected from the group consisting of: CaO, $SiO_2$, $ZrO_2$ and $Fe_2O_3$.

5. The gas turbine blade according to claim 1, having a basic body of a nickel or cobalt base superalloy whereby the ceramic thermal insulation layer is applied to the basic body and whereby a first layer is applied adjacent to the basic body, to which a second layer differing in composition from the first layer has been applied.

6. The gas turbine blade according to claim 5, whereby the basic body comprises a metallic corrosion protective layer applied to the superalloy.

7. The gas turbine blade according to claim 5, whereby the first layer comprises 10 to 95 percent by weight magnesium aluminate ($MgAl_2O_4$), 5 to 90 percent by weight magnesium oxide (MgO), 0 to 20 percent by weight aluminum oxide ($Al_2O_3$) and the second layer comprises yttrium oxide ($Y_2O_3$)-stabilized zirconium dioxide ($ZrO_2$).

8. The gas turbine blade according to claim 5, whereby the first layer comprises yttrium oxide ($Y_2O_3$)-stabilized zirconium dioxide ($ZrO_2$) and the second layer comprises 10 to 95 percent by weight magnesium aluminate ($MgAl_2O_4$), 5 to 90 percent by weight magnesium oxide (MgO) and 0 to 20 percent by weight aluminum oxide ($Al_2O_3$).

9. The gas turbine blade according to claim 5, whereby the first layer and the second layer comprise 10 to 95 percent by weight magnesium aluminate ($MgAl_2O_4$), 5 to 90 percent by weight magnesium oxide (MgO) and 0 to 20 percent by weight aluminum oxide ($Al_2O_3$), whereby the first layer has a smaller porosity than the second layer.

10. The gas turbine blade according to claim 1, whereby the ceramic thermal insulation layer is applied to a ceramic base layer that has a porosity of less than 2 percent by volume.

11. The gas turbine blade according to claim 1, whereby the porosity in the ceramic thermal insulation layer increases in increments towards the outside.

12. A gas turbine blade having a body comprising a nickel or cobalt base superalloy and a ceramic thermal insulation layer applied to the body, comprising:

a first layer applied adjacent the body, the first layer comprising:
10 to 95 percent by weight magnesium aluminate ($MgAl_2O_4$),
5 to 90 percent by weight of magnesium oxide (MgO),
0 to 20 percent by weight aluminum oxide ($Al_2O_3$),
wherein
the magnesium oxide is in a granule form with an average diameter of 0.1 μm to 10 μm and the magnesium oxide granules are disposed in a matrix of spinel-shaped magnesium aluminate; and a second layer differing in composition from the first layer applied to the first layer.

13. The gas turbine blade according to claim 12, wherein the second layer comprises yttrium oxide ($Y_2O_3$)-stabilized zirconium dioxide ($ZrO_2$).

14. The gas turbine blade accordingly to claim 12, wherein layers have a porosity exceeding 3 percent by volume.

15. The gas turbine blade according to claim 12, wherein the granules have an average diameter of 0.1 μm to 2 μm.

16. The gas turbine blade according to claim 12, wherein the thermal insulation layer contains 55 to 80 percent by weight magnesium oxide (MgO).

17. The gas turbine blade according to claim 12, wherein the thermal insulation layer further comprises at least one oxide selected from the group consisting of: CaO, $SiO_2$ $ZrO_2$ and $Fe_2O_3$.

18. The gas turbine blade according to claim 17, wherein the basic body comprises a metallic corrosion protective layer applied to the superalloy.

19. The gas turbine blade according to claim 12, having a body of a nickel or cobalt base superalloy wherein the ceramic thermal insulation layer is applied to the basic body and wherein the first layer is applied adjacent to the basic body, to which the second layer is applied.

20. A ceramic insulation layer of a turbine blade having porosity exceeding 3 percent by volume, comprising:

10 to 95 percent by weight magnesium aluminate ($MgAl_2O_4$);
5 to 90 percent by weight magnesium oxide (MgO);
0 to 20 percent by weight aluminum oxide ($Al_2O_3$); and
a residue of ordinary impurities,
whereby the magnesium oxide (MgO) has an average diameter of 0.1 μm to 10 μm and is arranged in a matrix of spinel-shaped magnesium aluminate ($MgAl_2O_4$).

* * * * *